United States Patent [19]
Ostwald

[11] Patent Number: 6,082,554
[45] Date of Patent: Jul. 4, 2000

[54] DATA STORAGE LIBRARY AND METHOD FOR ADAPTIVE CARTRIDGE STORAGE

[75] Inventor: Timothy C. Ostwald, Lousiville, Colo.

[73] Assignee: Storage Technology Corporation, Louisville, Colo.

[21] Appl. No.: 09/154,311

[22] Filed: Sep. 16, 1998

[51] Int. Cl.⁷ ........................................................ A47F 5/00
[52] U.S. Cl. ........................................ 211/41.12; 211/184
[58] Field of Search ................................... 211/41.12, 43, 211/184, 40, 48, 183, 1.51, 1.54

[56] References Cited

U.S. PATENT DOCUMENTS

| | | | |
|---|---|---|---|
| 3,907,116 | 9/1975 | Wolf et al. ................................. | 211/40 |
| 3,938,871 | 2/1976 | Bartholomew ........................... | 312/240 |
| 4,043,456 | 8/1977 | Howell ..................................... | 211/184 |
| 4,453,785 | 6/1984 | Smith ....................................... | 312/10 |
| 4,620,754 | 11/1986 | Lycke et al. ............................. | 312/330 |
| 4,653,649 | 3/1987 | Holdredge, Jr. ..................... | 211/41.12 |
| 4,707,247 | 11/1987 | Savoy .................................... | 211/40 X |
| 4,730,735 | 3/1988 | Lechner ............................... | 211/41.12 |
| 4,792,051 | 12/1988 | Miller ..................................... | 211/184 |
| 4,942,968 | 7/1990 | Fast ........................................ | 211/184 |
| 4,993,558 | 2/1991 | Assael ..................................... | 211/43 |
| 5,154,299 | 10/1992 | Hwang .................................... | 211/184 |
| 5,176,264 | 1/1993 | De Palma ............................ | 211/41.12 |
| 5,297,675 | 3/1994 | Martucci ................................ | 211/40 X |
| 5,358,325 | 10/1994 | Teale ...................................... | 312/287 |
| 5,427,446 | 6/1995 | Glomski ................................. | 312/242 |
| 5,458,238 | 10/1995 | Dominguez-Gutierrez ..... | 206/307.1 X |
| 5,498,116 | 3/1996 | Woodruff et al. ...................... | 414/331 |
| 5,685,423 | 11/1997 | Hunt ................................... | 206/307.1 |
| 5,692,623 | 12/1997 | Todor et al. ......................... | 211/41.12 |

*Primary Examiner*—Daniel P. Stodola
*Assistant Examiner*—Jennifer E. Novosad
*Attorney, Agent, or Firm*—Brooks & Kushman P.C.

[57] ABSTRACT

A data storage library and method for adaptively storing data cartridges therein utilizes a housing and a plurality of partitions removably mounted within the housing. Each partition has a longitudinal axis, a first side, and a second side, where each side includes a plurality of slots sized to receive at least a portion of a data cartridge. Either the partitions or the housing includes projections, and the other includes sets of apertures sized to receive the projections in order to mount the partitions within the housing. Pairs of partitions can be spaced and aligned with either their first sides or their second sides facing to form arrays capable of storing data cartridges. By removing a selected pair of partitions from a selected set of apertures, rotating the selected pair of partitions about an axis perpendicular to the partition longitudinal axis, and remounting the selected pair of partitions in the selected set of apertures, the spacing of the selected pair of partitions can be changed to accommodate cartridges of a different size.

12 Claims, 7 Drawing Sheets

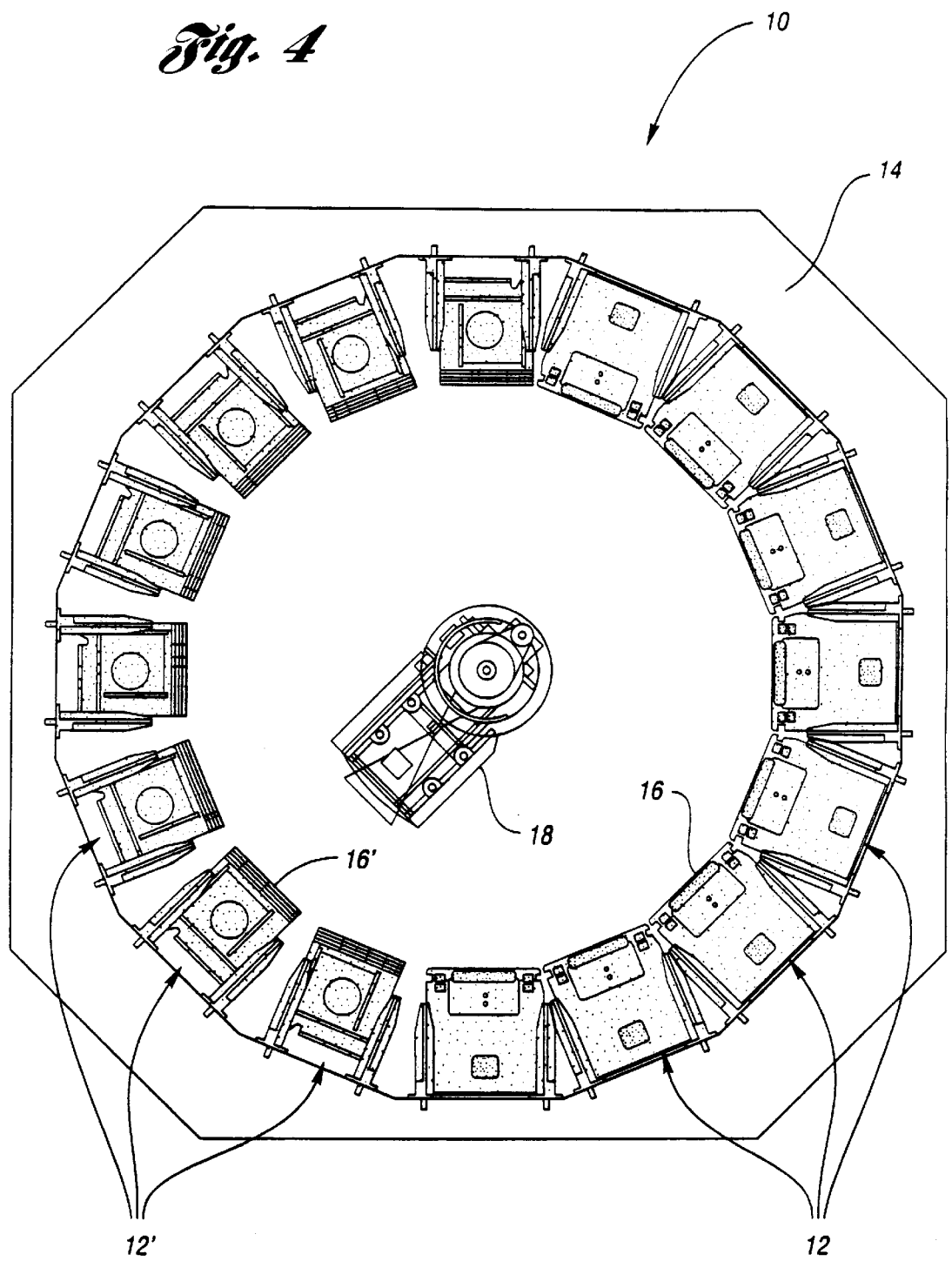

DATA STORAGE LIBRARY AND METHOD FOR ADAPTIVE CARTRIDGE STORAGE

TECHNICAL FIELD

This invention relates to data storage libraries, and more particularly to a data storage library which utilizes adaptable arrays to store data cartridges of uniform or differing sizes.

BACKGROUND ART

A popular device for handling large amounts of information in a data processing system is the data storage library. These libraries store and manage large numbers of data cartridges, typically containing magnetic tape on which data is recorded. A data storage library is comprised of arrays of storage cells, each cell being formed to contain a single data cartridge. The arrays each hold a plurality of data cartridges, and each data cartridge has some kind of identifying information, such as a label or bar code. Typically, the arrays surround a robotic arm which has an optical system for selecting cartridges, and is operable to locate a particular storage cell and retrieve and transport a data cartridge therefrom. The storage cells preferably have exact dimensions that correspond to the size of the cartridges, since the cartridges must be positioned in a precise manner if the robotic arm is to grasp them correctly.

Different hardware manufacturers have independently developed data cartridges that are unique to each manufacturer. Accordingly, the owner of a data storage library may wish to use a variety of different cartridge types within a single library system. However, it has traditionally been a problem in library design to accommodate data cartridges of different sizes into the same library enclosure. For instance, if a single size storage cell is used for storing data cartridges of different sizes, the robotic arm may have difficulty transferring a cartridge due to misalignment of the cartridge within its storage cell. Alternatively, a fixed number of storage cells sized for each different type of cartridge may be provided within the data storage library. However, this solution is undesirable since each library must be specially customized with fixed numbers of storage cells corresponding to the owner's needs, and those needs may change over time.

Therefore, a need exists for a data storage library which may be easily adapted to accommodate cartridges of different sizes, such that library users may modify their distribution of different cartridge types and still retain their investment in their library systems.

DISCLOSURE OF THE INVENTION

Therefore, it is an object of the present invention to provide a data storage library having arrays which are easily adaptable.

It is another object of the present invention to provide a data storage library which is capable of accommodating data cartridges of different sizes.

It is a further object of the present invention to provide a data storage library which may be adapted to storing different numbers of different sized cartridges.

It is a still further object of the present invention to provide a data storage library which utilizes library space efficiently to store data cartridges of different sizes.

It is another object of the present invention to provide a data storage library which has arrays capable of extended wear.

Accordingly, a data storage library with adaptable arrays is provided. The data storage library includes a housing and a plurality of partitions removably mounted within the housing. Each partition has a first side and a second side each provided with a plurality of slots which are sized to receive data cartridges. Pairs of partitions may be spaced and aligned with either their first sides or their second sides facing to form arrays capable of storing data cartridges. A pair of partitions may be remounted to change which sides thereof are facing, such that a new, unused array is formed for extended wear.

In a preferred embodiment, each partition has a first side provided with a plurality of slots of a first size and a second side provided with a plurality of slots of a second size, such that a pair of partitions spaced and aligned with their first sides facing forms an array capable of storing data cartridges of a first size, and a pair of partitions aligned with their second sides facing forms an array capable of storing data cartridges of a second size. A pair of partitions may be remounted to change which sides thereof are facing, thereby changing the type of cartridge held within the array formed by the partitions.

The above objects and other objects, features, and advantages of the present invention are more readily understood from a review of the attached drawings and the accompanying specification and claims.

BRIEF DESCRIPTION OF THE DRAWINGS

FIG. 4 is a top view of an alternative configuration of a data storage library in accordance with the present invention;

FIG. 6 is a back view of the adaptable array shown in FIG. 5a.

BEST MODES FOR CARRYING OUT THE INVENTION

Figure 1:
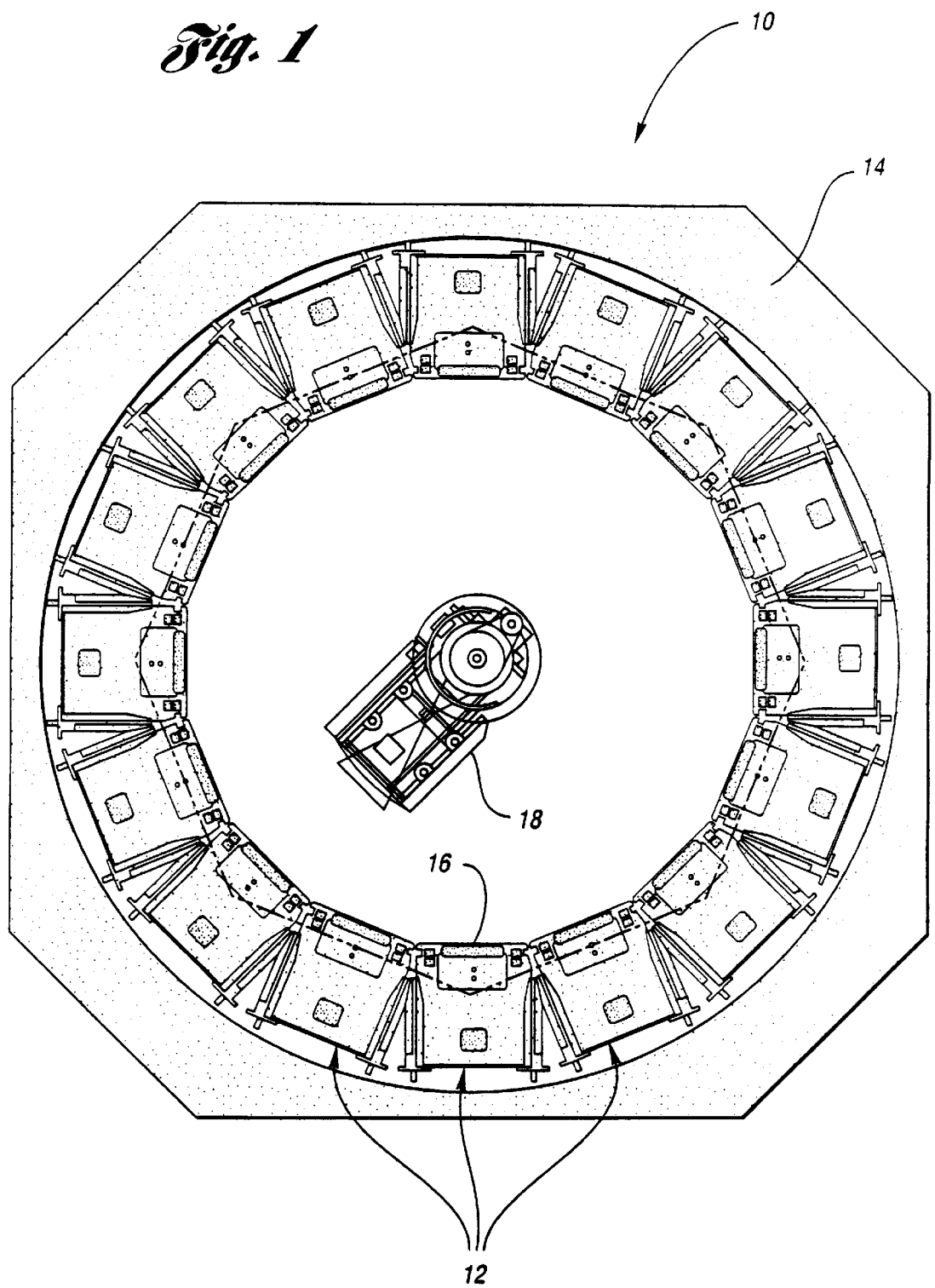
FIG. 1 is a top view of a data storage library in accordance with the present invention.
Figure 2:
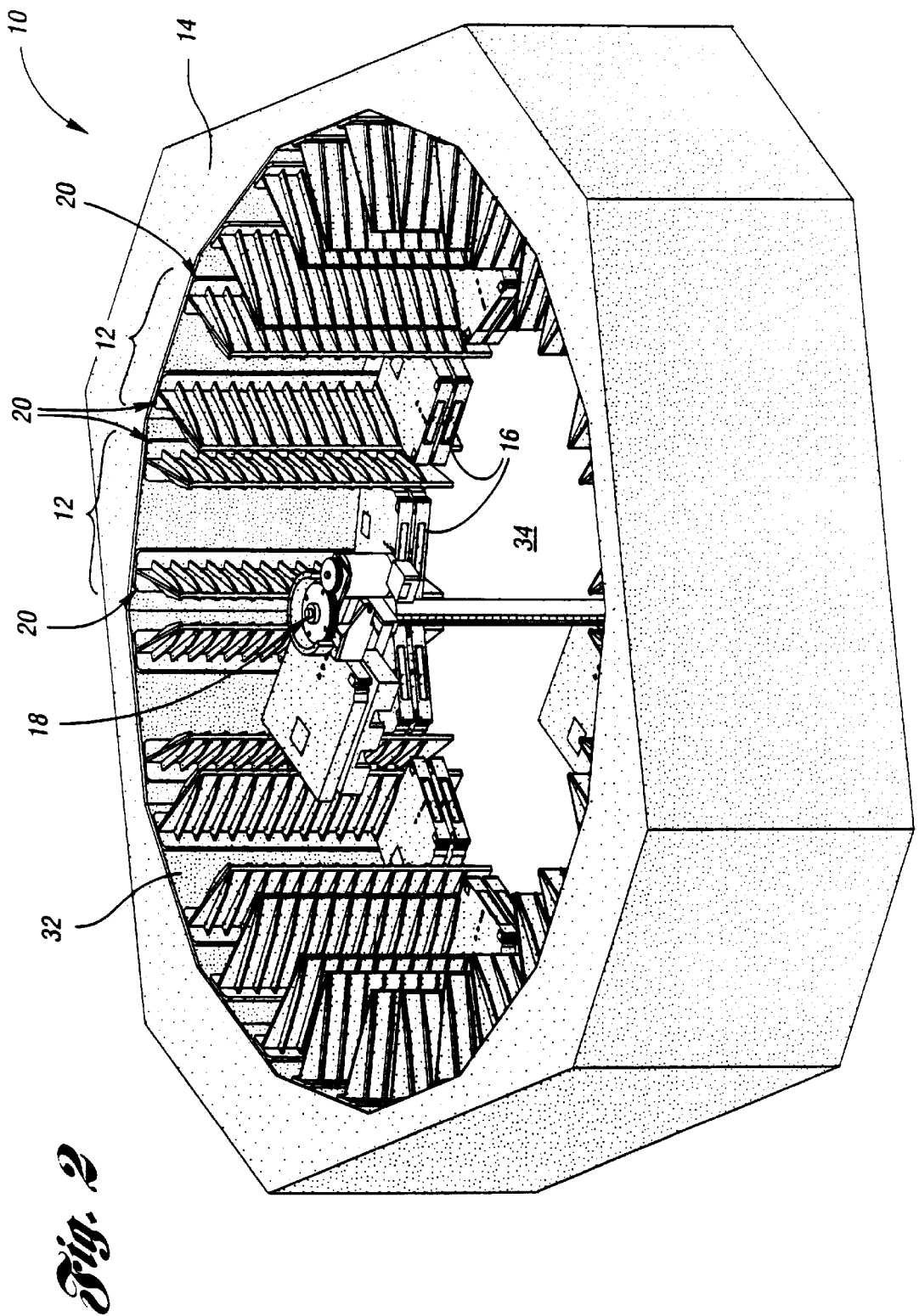
FIG. 2 is a perspective view of the data storage library shown in FIG. 1.

Referring first to FIGS. 1 and 2, a typical data storage library 10 is shown. Library 10 contains a plurality of storage arrays 12 mounted within a housing 14, wherein each storage array 12 is preferably designed to hold a number of data cartridges 16. In a preferred embodiment, arrays 12 are mounted to surround an actuator, such as a robotic arm 18. Although housing 14 is depicted herein to be cylindrical, the present invention applies equally well to data storage libraries utilizing other housing structures and storage configurations. Preferably, the operation of library 10 is automated and is directed by a processor, such as a host computer (not shown). The processor provides signals to robotic arm 18 to control its motion and operation, and therefore control the handling and storage of cartridges 16 within data storage library 10. The processor also controls the operation of an optional tape drive (not shown) located within data storage library 10.

Figure 3:
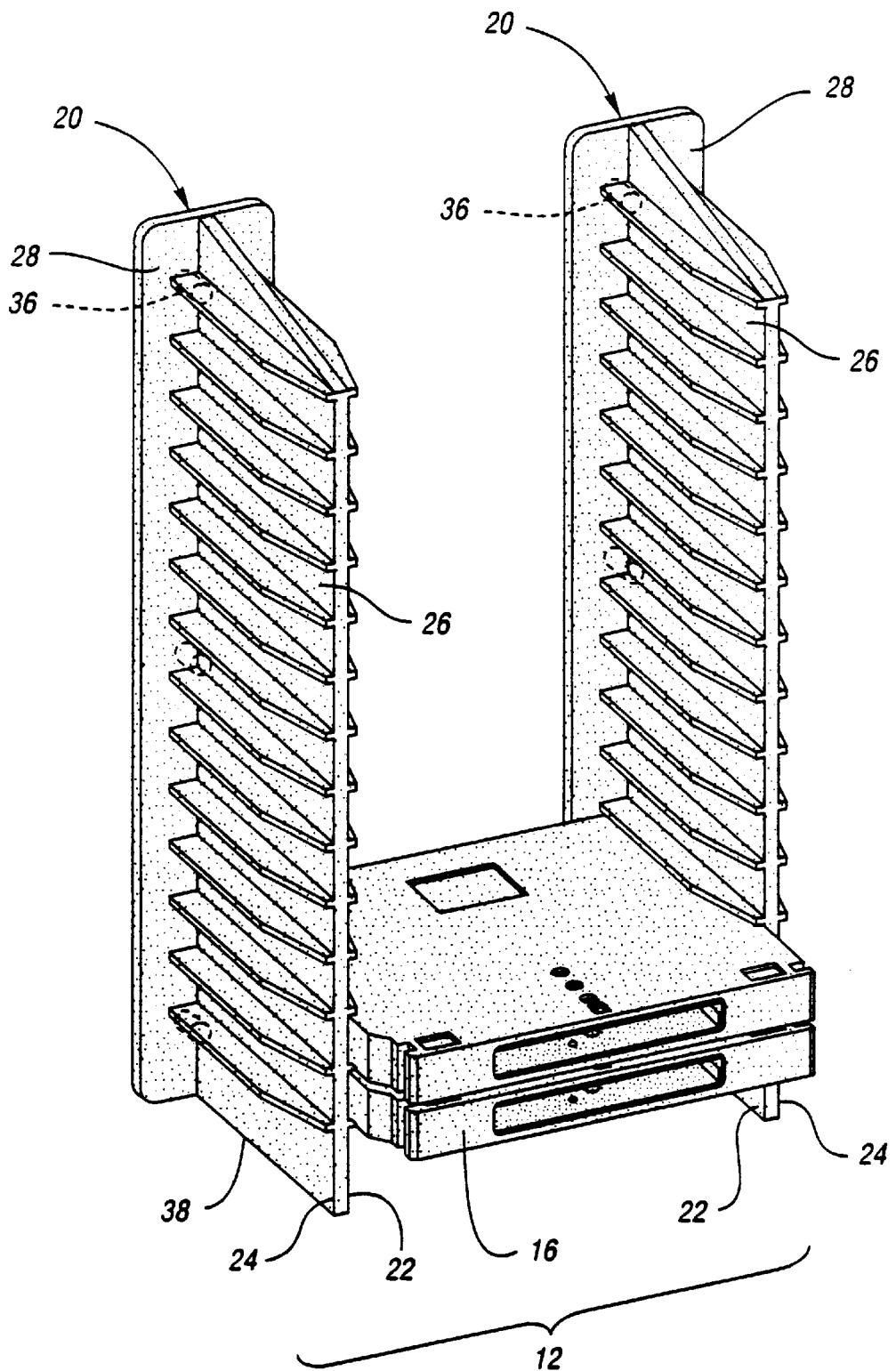
FIG. 3 is a perspective view of an adaptable array of the present invention.

As shown in FIGS. 2 and 3, arrays 12 of the present invention are formed from pairs of two-sided partitions 20 which are spaced apart and aligned. Partitions 20 have a first side 22 and a second side 24, each provided with at least one slot 26 for receiving at least a portion of a data cartridge 16.

Partitions 20 also include a back wall 28 from which slots 26 extend, and preferably slots 26 are slanted to bias data cartridges 16 toward back wall 28 for more secure storage.

In the present invention, partitions 20 are mounted in a removable manner within housing 14. Preferably, arrays 12 are mounted vertically to a wall 32 within housing 14. Alternatively, a horizontal configuration could be employed, or partitions 20 could be mounted to the floor 34 of housing 14. Preferably, partitions 20 include mounting projections, such as pins 36 or other similar devices, to fasten partitions 20 to housing 14. Pins 36 may be provided on back wall 28, extending in a direction opposite to slots 26, or alternatively may be provided on a bottom surface 38 of partitions 20 for mounting to the floor 34 of housing 14. Depending on the placement of pins 36, either housing wall 32 or floor 34 is provided with apertures (not shown) sized to receive pins 36 and fasten partitions 20 thereto. Of course, pins 36 may alternatively be located on housing 14 with corresponding apertures provided on partitions 20, or any other suitable mounting device may be utilized.

FIG. 3 shows an array 12 wherein first side 22 and second side 24 are provided with slots 26 designed to hold the same cartridge type 16. Therefore, pairs of partitions 20 may first be removably mounted within housing 14 with their first sides 22 spaced apart and aligned to form arrays 12, and then later remounted with their second sides 24 spaced apart and aligned to form new, unused arrays 12, providing a new wear surface once the old surface becomes worn. Preferably, remounting partitions 20 comprises removing partitions 20 from housing 14, rotating partitions 20 180 degrees about an axis perpendicular to housing 14, and reattaching partitions 20 to housing 14 in their new configuration. Advantageously, this remounting operation may easily be accomplished by library users in the field.

FIG. 4 illustrates a preferred embodiment of data storage library 10 which accommodates different sized data cartridges within the same library enclosure. As shown, arrays 12 hold a first type of cartridge 16 and arrays 12' hold a second type of cartridge 16'. Data storage library 10 is capable of storing exclusively arrays 12 as shown in FIG. 1, exclusively arrays 12', or a combination of arrays 12 and 12' as shown in FIG. 4. These different array configurations can be achieved without any change in storage capacity, thereby optimizing the space within library 10. Although only two different types of arrays are illustrated in FIG. 4 and described herein, additional types of arrays could be utilized to accommodate even more cartridge sizes.

Figure 5A:
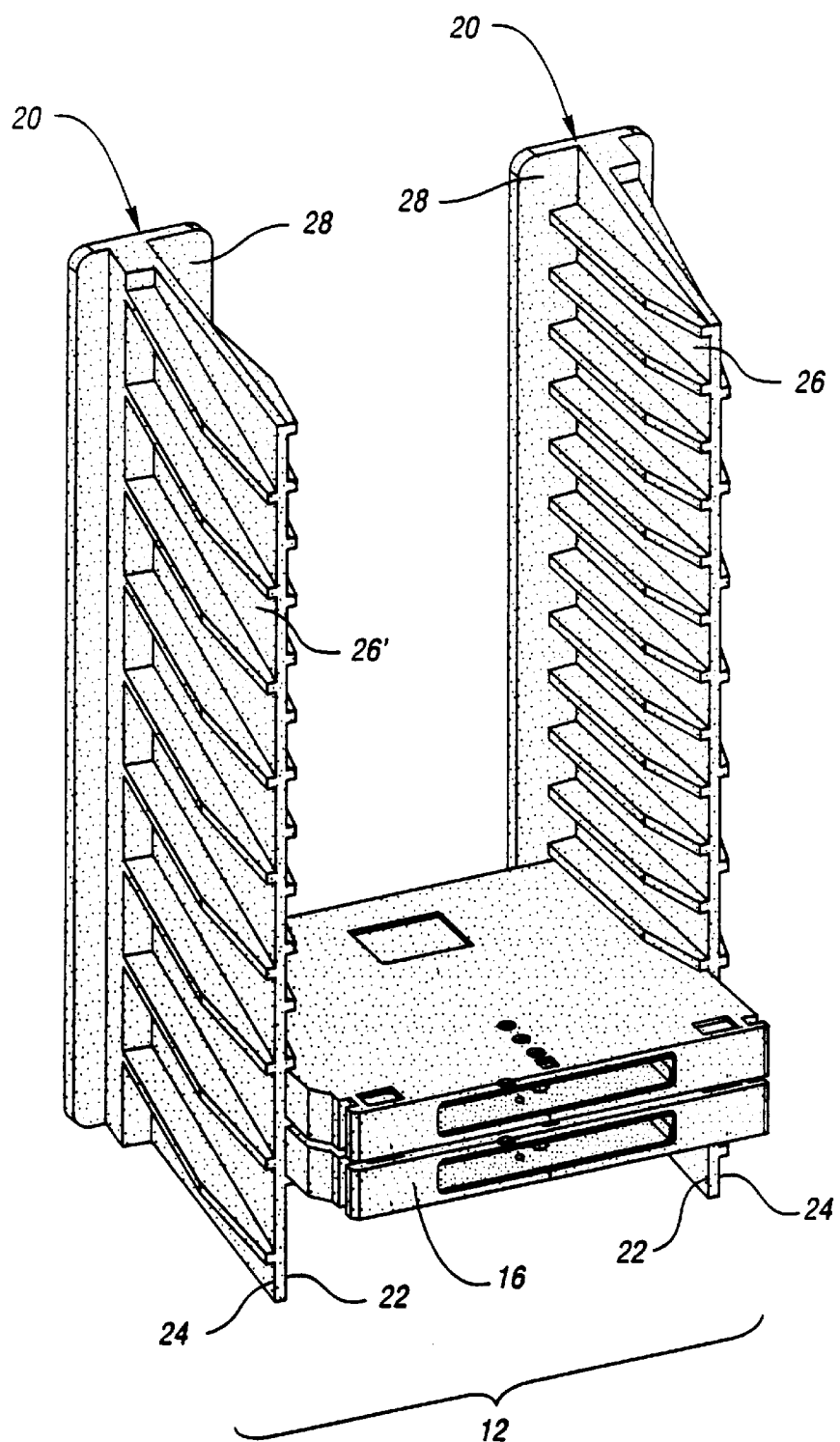
FIGS. 5a and 5b are perspective views of a preferred embodiment of the adaptable array of the present invention.
Figure 5B:
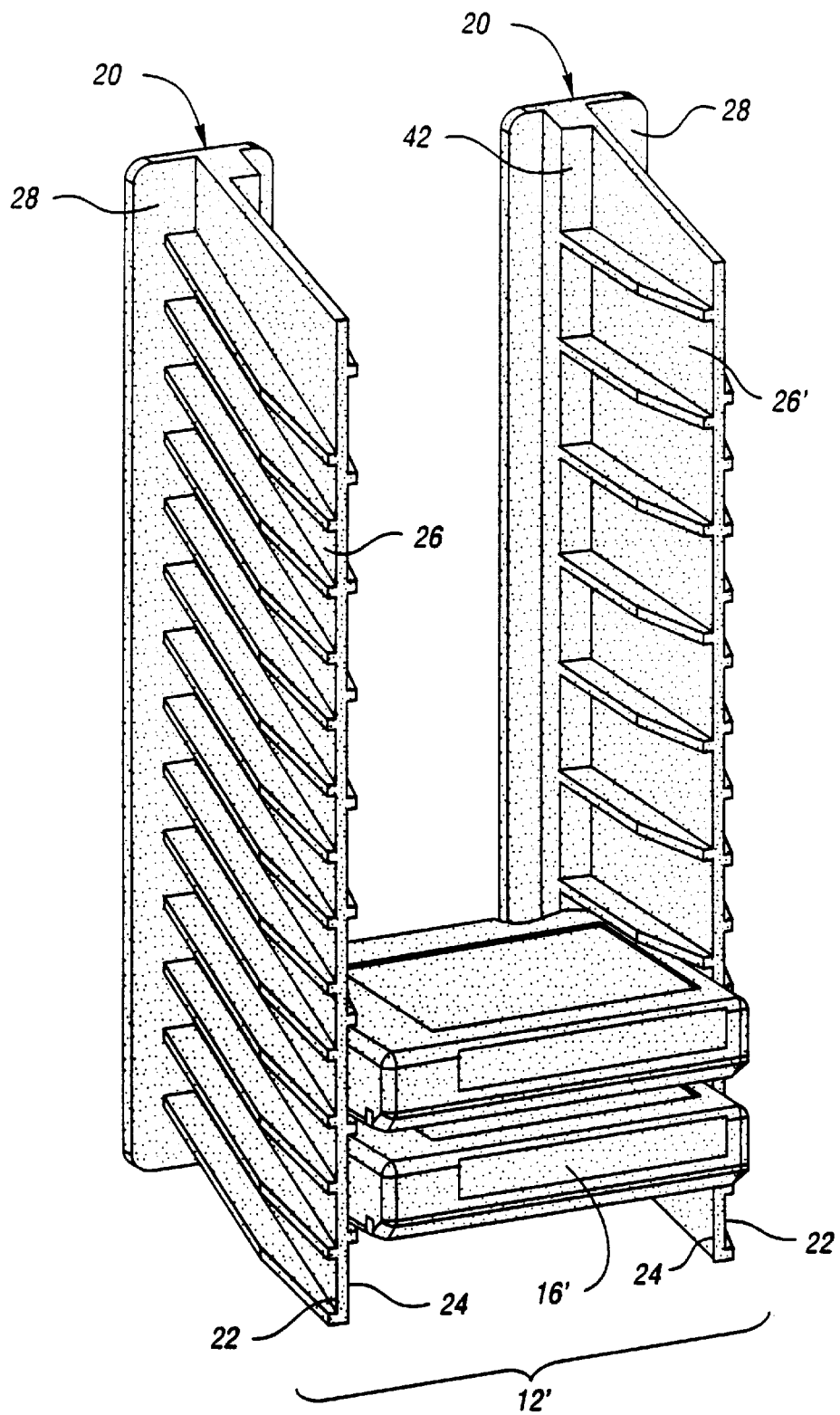

As shown in FIGS. 5a and 5b, the first side 22 of each partition 20 has slots 26 designed to hold a first cartridge type 16, and the second side 24 of each partition 20 has slots 26' designed to hold a second cartridge type 16' of a different size. For the typical library application, it is desired that the distance from each data cartridge 16 or 16' to robotic arm 18 is equal. In the present invention, this is accomplished by providing stops 42 extending generally perpendicularly from back wall 28 any distance necessary to standardize the depth of the different cartridges 16 and 16' within arrays 12 and 12', respectively. For instance, with reference to FIG. 5b, stops 42 are provided on second sides 24 of partitions 20 in order to locate data cartridges 16' at a forward distance equal to that of data cartridges 16.

Figure 6:
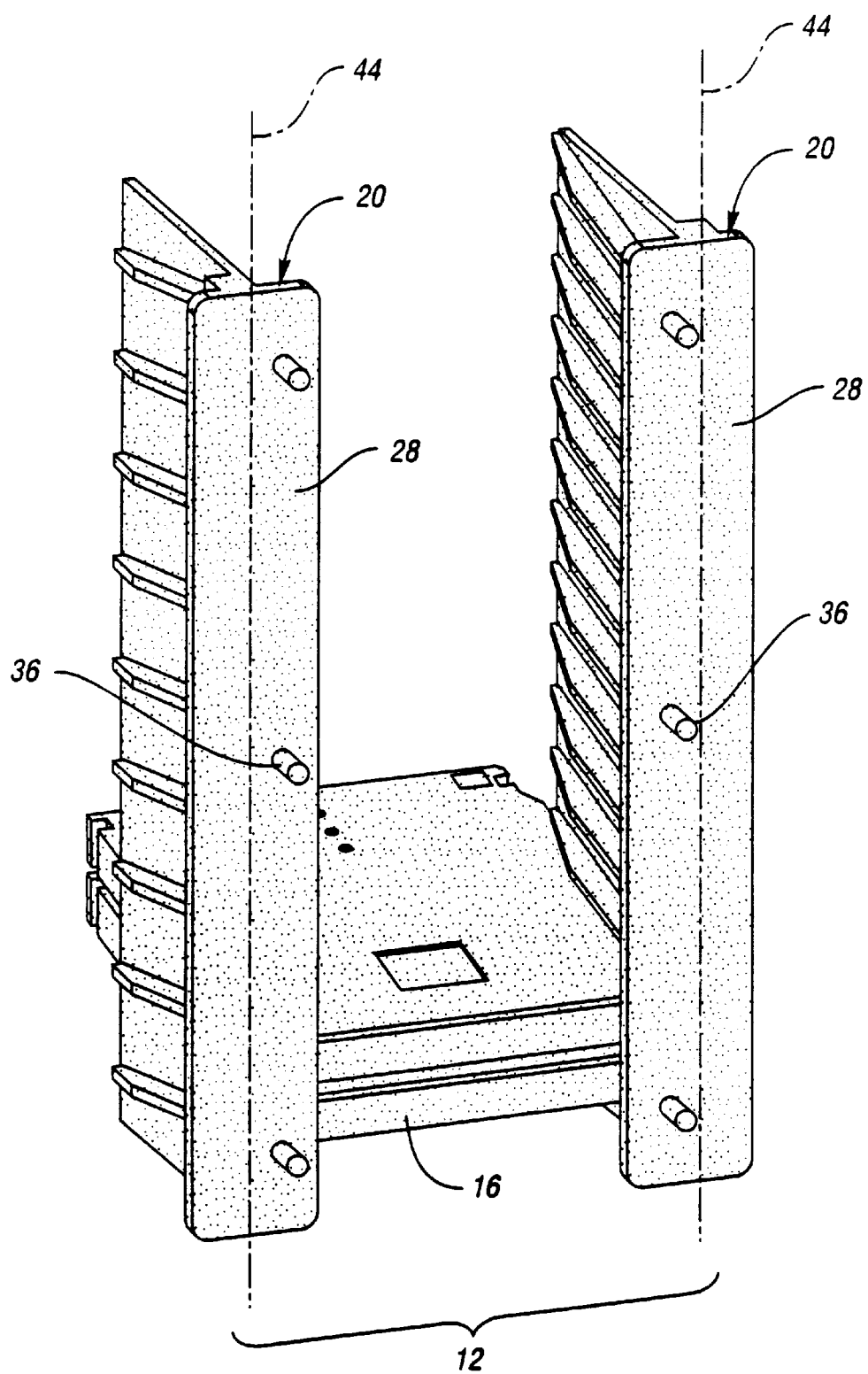

As above, partitions 20 include mounting projections, such as pins 36, to fasten partitions 20 to housing 14. In the preferred embodiment depicted in FIG. 6, pins 36 are offset from a longitudinal axis 44 of the partition 20. Then, if a partition 20 is rotated and remounted using the same set of apertures, this offset placement has the effect of changing the spacing of partitions 20. Alternatively, of course, housing 14 may be provided with different sets of apertures which may be used depending on the array configuration chosen.

Therefore, certain pairs of partitions 20 may be removably mounted within housing 14 with their first sides 22 spaced apart and aligned to form arrays 12 capable of storing data cartridges 16 of a first size, and other pairs of partitions 20 may be removably mounted within housing 14 with their second sides 24 spaced apart and aligned to form arrays 12' capable of storing data cartridges 16' of a second size. Later, if a different distribution of arrays 12 and 12' is desired, one or more pairs of partitions 20 may be remounted in the manner described above. Therefore, a library user can select the array types required to accommodate different cartridge types in his/her library, and alter the array types to upgrade to different distributions of cartridge types as the need arises.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A data storage library, comprising:

a housing, the housing including sets of apertures; and a plurality of partitions removably mounted within the housing, each partition having a longitudinal axis, a back wall, a first side, and a second side, each side provided with at least one slot sized to receive at least a portion of a data cartridge, wherein the partitions include projections provided along the back wall offset from the longitudinal axis that are sized to be received in the sets of apertures in order to mount the partitions within the housing;

wherein pairs of partitions are spaced apart and aligned with either their first sides or their second sides facing to form arrays capable of storing data cartridges, and wherein a selected pair of partitions can be removed from a selected set of apertures, rotated about an axis perpendicular to the partition longitudinal axis, and remounted in the same, selected set of apertures to change the spacing of the selected pair of partitions to accommodate cartridges of a different size.

2. The data storage library of claim 1, wherein the partitions are mounted vertically.

3. The data storage library of claim 1, wherein the housing is cylindrical.

4. The data storage library of claim 1, wherein the housing is polygonal.

5. The data storage library of claim 1, further comprising an automated, robotic arm located within the housing.

6. The data storage library of claim 1, wherein the slots extend from the back wall.

7. The data storage library of claim 6, further comprising stops extending generally perpendicularly from the back wall to limit the depth of the data cartridges within the array.

8. The data storage library of claim 1, wherein the first side is provided with at least one slot of a first size and the second side is provided with at least one slot of a second size.

9. A method for adaptively storing data cartridges within a data storage library, the method comprising:

providing a plurality of partitions, each partition having a longitudinal axis, a first side, and a second side, each side provided with at least one slot sized to receive at least a portion of a data cartridge;

mounting pairs of the partitions within a housing with either their first sides or second sides spaced apart and aligned to form arrays capable of storing data cartridges, wherein either the partitions or the housing includes sets of projections, and the other includes sets of apertures sized to receive the projections in order to mount the partitions within the housing;

removing a selected pair of partitions from the housing by disengaging a corresponding selected set of projections and apertures;

rotating the selected pair of partitions about an axis perpendicular to the partition longitudinal axis; and remounting the selected pair of partitions in the housing by re-engaging the same, selected set of projections and apertures to change the spacing of the selected pair of partitions and accommodate cartridges of a different size.

10. The method of claim 9, wherein providing a plurality of partitions includes providing a plurality of partitions wherein the first side is provided with at least one slot of a first size and the second side is provided with at least one slot of a second size.

11. The method of claim 9, wherein mounting pairs of the partitions within the housing results in the sets of projections and apertures being offset from the longitudinal axis of each partition.

12. The method of claim 9, wherein providing a plurality of partitions includes providing a plurality of partitions wherein the projections are provided along a back wall of the partitions.

* * * * *